United States Patent [19]

Hagiwara et al.

[11] Patent Number: 4,597,677
[45] Date of Patent: Jul. 1, 1986

[54] LEAF-TYPE FOIL THRUST BEARING

[75] Inventors: Yoshiyuki Hagiwara; Teru Morishita, both of Aichi, Japan

[73] Assignees: Taiho Kogyo Co.; Toyota Motor Corp., both of Japan

[21] Appl. No.: 786,936

[22] Filed: Oct. 11, 1985

[30] Foreign Application Priority Data

Oct. 13, 1984 [JP] Japan .................................. 59-213262

[51] Int. Cl.⁴ ............................................. F16C 32/06
[52] U.S. Cl. ..................................... 384/105; 384/106
[58] Field of Search ................................. 384/103–106, 384/121, 123, 100

[56] References Cited

U.S. PATENT DOCUMENTS

| 4,082,375 | 4/1978 | Fortmann | 384/105 |
| 4,116,503 | 9/1978 | Licht | 384/123 |
| 4,208,076 | 6/1980 | Gray | 384/105 |
| 4,213,657 | 7/1980 | Gray | 384/105 |
| 4,225,196 | 9/1980 | Gray | 384/121 X |
| 4,227,752 | 10/1980 | Wilcock | 384/106 |
| 4,462,700 | 7/1984 | Agriwal | 384/106 |

Primary Examiner—Stuart S. Levy
Assistant Examiner—Thomas R. Hannon
Attorney, Agent, or Firm—Sughrue, Mion, Zinn, Macpeak & Seas

[57] ABSTRACT

A leaf-type foil thrust bearing, such as may be employed in a high-speed, light-load application, particularly, as a thrust bearing for a turbo charger, having a significantly reduced manufacturing cost. A plurality of recesses are formed in a thrust surface of a seat member disposed opposite the bearing surface of a rotating bearing member. The recesses gradually become shallower from their forward edges to the rearward edges in the direction of rotation of the rotating members. Corrugated foils are disposed in each of the recesses, with the corrugation height of each of the foils being constant. Top foils cover the respective corrugated foils, and each of the top foils has a forward edge attached to the thrust surface adjacent the forward edges of each of the recesses.

4 Claims, 5 Drawing Figures

LEAF-TYPE FOIL THRUST BEARING

BACKGROUND OF THE INVENTION

The present invention relates to a fluid lubrication type bearing adapted for use in a high-speed, light-load application. More particularly, the invention relates to a leaf-type foil thrust bearing such as may be employed for a thrust bearing of a turbocharger.

Conventional leaf-type foil thrust bearings operated at a high speed and under a light load generally employ plural corrugated foils arranged on the surface of a seat member of the bearing confronting the surface of a rotating member, for instance, a rotary shaft, with a small gap therebetween. Each of the corrugated foils has thereon a thin planar top foil, one end of which is attached to the surface of the seat member.

In this type of bearing, a wedge of fluid (gas) is formed in the bearing gap between the top foil and the opposite face of the rotating member, thereby to provide stable lubrication. For this purpose, it has been the practice, as illustrated in FIG. 1, to employ corrugated foils 1 having corrugations of a varying height. Accordingly, the top foil 5 carried on the corrugated foil 3 is slanted with respect to the opposing surface of the bearing member 6. One end 5a of the top foil 5 is attached to the seat member 1 at the end of the top foil 5 in the direction of rotation of the seat member 1. As a result, the top foil is subjected to a pressure distribution as indicated in the top part of FIG. 1.

Because the slope of the top foil 5 must be precisely controlled, it is necessary to very precisely control the heights of the corrugations of the corrugated foil 3. In practice, this is very difficult to achieve. That is, it is expensive to manufacture such a corrugated foil with a high degree of precision.

SUMMARY OF THE INVENTION

Accordingly, it is a primary object of the present invention to provide a leaf-type foil thrust bearing which can be manufactured at a lesser cost, that is, without requiring a corrugated foil of high precision having a varying corrugation height.

Satisfying the above and other objects of the invention, a leaf-type foil thrust bearing is provided in which each of plural corrugated foils are received in respective recesses formed in the surface of the seat member, which recesses are equiangularly spaced from one another. Further, each of the recesses becomes gradually shallower from its forward edge to its rearward edge, that is, in the direction of rotation of the opposing rotating bearing surface. Each of the corrugated foils has a fixed corrugation height. Top foils are fitted over each of the respective corrugated foils with an edge thereof in the forward direction connected to the surface of the seat member.

With this arrangement, the surfaces of the top foils slope according to the varying depth of the corresponding recesses. Accordingly, a wedge-shaped film of lubricating fluid is stably produced in the bearing gap defined between the top foil and the opposing surface of the rotating bearing member, and hence a non-contact bearing operation is provided which is suitable for applications in which the load is relatively light but in which the rotating speed of the bearing is rather high.

The corrugated foil having a fixed corrugation height is simple to manufacture and is inexpensive. Accordingly, the manufacturing cost of the bearing of the invention is significantly reduced compared with that of the conventional bearing.

The above and other objects, features and advantages of the present invention will become more apparent from the description of the preferred embodiment below, taken in conjunction with the accompanying drawings.

DESCRIPTION OF THE PREFERRED EMBODIMENTS

Figure 1:
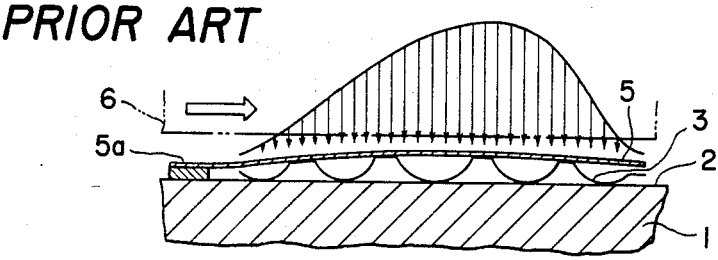
FIG. 1 is a fragmentary sectional view showing the structure of a conventional leaf-type foil thrust bearing.

A preferred embodiment of the invention will now be described with reference to FIGS. 2 through 5 of the accompanying drawings.

Referring to FIGS. 2 through 5, a leaf-type foil thrust bearing of the invention includes a seat member 11 in the form of a disc having an axially extending throughhole. The seat member 11 is disposed coaxially opposite a rotating bearing member 12, for example, in the form of a rotating shaft. A thrust surface 11a of the seat member 11 opposes the surface 12a of the rotating member 12.

A plurality of recesses 13, in this example, four, are formed in the surface 11a of the seat member 11. The recesses 13 are equiangularly spaced from one another in the direction of rotation of the rotating member 12. The four recesses 13 extend along respective lines $R_1$ through $R_4$ radially of the seat member 11, the lines $R_1$ through $R_4$ intersecting each other at right angles. Forward and rearward edges 13a and 13b, respectively, of each of the recesses 13 extend in the direction of an arrow A, namely, in the direction of rotation of the rotating member 12.

Figure 2:
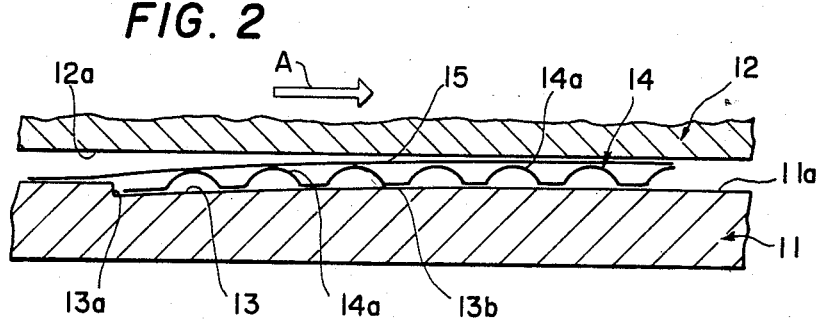
FIG. 2 is an enlarged sectional view taken along a line I—I in FIG. 3 and showing a leaf-type foil thrust bearing constructed in accordance with the present invention.
Figure 3:
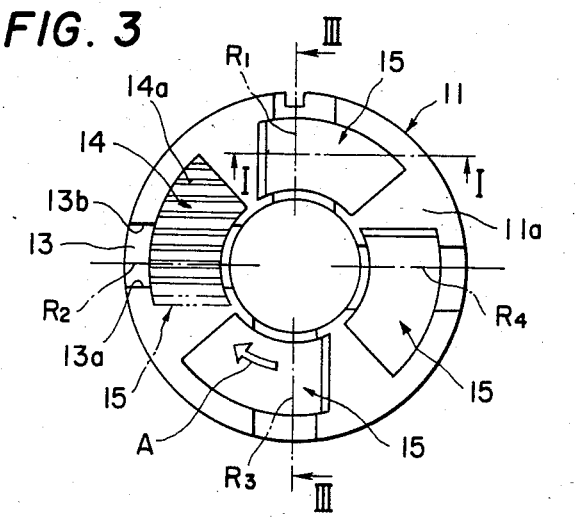
FIG. 3 is a plan view of a leaf-type foil thrust bearing of the present invention.
Figure 4:
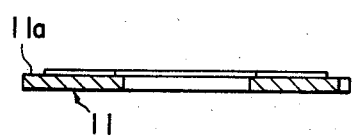
FIG. 4 is a sectional view of the bearing of FIG. 3 taken along a line III—III in FIG. 3.
Figure 5:
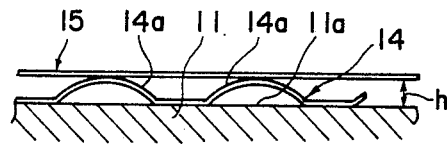
FIG. 5 is an enlarged sectional view of a portion of the bearing of FIG. 3.

As shown best in FIG. 2, the depth of each of the recesses 13 gradually becomes more shallow moving from the forward edge 13a to the rearward edge 13b. In this example, the recesses 13 are deepest at the portion adjacent the forward edges 13a. The rearward edges 13b of the recesses 13 terminate at the upper surface of the thrust surface 11a of the seat member 11.

In each of the recesses 13 is disposed a corrugated foil 14 and a covering top foil 15. Each of the corrugated foils 14 is formed from a thin flexible metal plate and has a constant corrugation height. Preferably, the corrugation pitch is constant for each of the four foils. In this example, the corrugations 14a of each of the foils 14 extend in a direction parallel to respective ones of the lines $R_1$ through $R_4$, but an arrangement may be employed in which the corrugations all extend directly radially. As shown in FIG. 2, one end of each of the corrugated foils 14 is located adjacent the forward edge 13a of the respective recess 13, whereas the other end of the corrugated foils 14 extends to a position adjacent the upper surface of the thrust surface 11. This creates a slope along the corrugated foils 14 corresponding to the change in depth of the respective recesses 13.

Each of the top foils 15 is formed from a thin and planar flexible metal plate and has the shape of a sector so as to substantially cover the corresponding corrugated foil 14 and recess 11. Preferably, the upper surfaces of each of the top foils 15 is covered with a polytetrafluoroethylene resin.

One end of each of the top foils 15 is fixed to the top of the thrust surface 11a of the seat member 11 adjacent the forward edge 13a of the respective recess 13. For this purpose, an adhesive, a bonding agent, spot welding, or the like may be employed. The other end of the top foil 15 is laid along the top of the respective corrugated foil 14.

The corrugation height h of each of the foils 14 is preferably less than 1 mm. The slope of each of the recesses is preferably of the order of 1/1000 to 1/28.

In the leaf-type foil thrust bearing constructed as described above, the upper surface of each of the top foils 15 is sloped in the direction A of rotation of the rotating member 12, substantially along the gradient of the respective recess 13. As a result, a wedge-shaped film of the lubricating fluid is stably produced between each top foil 15 and the opposing bearing surface of the rotating member 12. Accordingly, each top foil 15 is subjected to a stress distribution substantially similar to that of the conventional thrust bearing described above so that a non-contact bearing operaton is stably obtained, even when the bearing is operated at a high speed.

In general, the corrugated foils 14 may be fabricated by the use of a press mold or the like. The fact that the corrugation height of the foils 14 is constant makes the foils much easier to manufacture, and thus they can be provided at a low cost while maintaining a high precision. Further, it is noted that with available machining techniques, the recesses 13 can easily be formed in the surface of the seat member 11 at a low cost.

In the embodiment above, it has been described that four corrugated foils, top foils and recesses are employed. However, other numbers may be used as well. Also, other shapes of the corrugations of the foils 14 may be employed. Still further, the corrugated foils can be inverted from the positions shown in the drawings, that is, the tops of the corrugations may be placed in abutment with the surfaces of the respective recesses 13.

This completes the description of the preferred embodiments of the invention. Although preferred embodiments have been described, it is believed that numerous modifications and alterations thereto would be apparent to one of ordinary skill in the art without departing form the spirit and scope of the present invention.

We claim:

1. A leaf-type foil thrust bearing comprising: a rotating bearing member, a fixed seat member, said seat member having a thrust surface opposing a bearing surface of said bearing member, said thrust surface having formed therein a plurality of recesses, each of said recesses becoming gradually shallower in a direction from a forward edge to a rear edge of said recesses in a direction of rotation of said rotating member; a plurality of corrugated foils, each of said corrugated foils being disposed in a respective one of said recesses, each of said corrugated foils having a constant corrugation height, and each of said corrugated foils extending from a forward edge of each of said recesses to the rearward edge of said recesses; and a plurality of substantially planar sheet-like top foils, one of said top foils being arranged over each of said corrugated foils, and each of said top foils having an end adjacent the respective forward edge of the respective recess fixed to said thrust surface.

2. The leaf-type foil thrust bearing according to claim 1, wherein forward and rearward edges of each of said recesses extend parallel to radial lines on said thrust surface.

3. The leaf-type foil thrust bearing according to claim 2, wherein corrugations of each of said corrugated foils are parallel within each foil and one of said corrugations of each of said foils lies along a radial line on said thrust surface.

4. The leaf-type foil thrust bearing according to claim 3, wherein a rearward edge of each of said recesses is flush with a top of said thrust surface.

* * * * *